(12) United States Patent
Kind

(10) Patent No.: US 6,415,434 B1
(45) Date of Patent: Jul. 2, 2002

(54) APPARATUS AND METHOD FOR A RUNTIME METHOD OVERLOADING RESOLVER

(75) Inventor: Lance Kind, Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/336,886

(22) Filed: Jun. 18, 1999

(51) Int. Cl.[7] .............................................. G06F 9/44
(52) U.S. Cl. ....................... 717/107; 717/106; 717/108; 717/114; 717/116; 717/131; 717/133; 717/162; 717/165; 717/166
(58) Field of Search .............................. 717/1, 2, 11, 9, 717/106, 107, 108, 114, 116, 10, 162, 165, 166, 131, 133

(56) References Cited

U.S. PATENT DOCUMENTS

| | | | | |
|---|---|---|---|---|
| 5,488,727 A | * | 1/1996 | Agrawal et al. ................ | 717/9 |
| 5,696,974 A | * | 12/1997 | Agrawal et al. ............. | 717/131 |
| 5,838,977 A | * | 11/1998 | Gupta ......................... | 717/116 |
| 5,889,992 A | * | 3/1999 | Koerber ...................... | 717/108 |
| 6,085,035 A | * | 7/2000 | Ungar ......................... | 709/221 |
| 6,138,269 A | * | 10/2000 | Ball et al. ................ | 707/103 R |

OTHER PUBLICATIONS

IBM Technical Disclosure Bulletin, "Implementing Operator Overloading to Create Generic Methods", vol. 34, No. 7B, pp. 255–258, Dec. 1991.*

Tichy, "Smart Recompilation", ACM, pp. 273–291, Jul. 1986.*

Castagna et al., "A Calculus for Overloaded Functions with Subtyping", ACM, pp. 182–192, Jun. 1992.*

U.S. Patent Application Ser. No. 09/335,933 filed Jun. 18, 1999 for "Apparatus and Method for Implementing a Network Protocol That Supports the Transmission of a Variable Number of Application–Usable Objects Over a Network as a Single Network Transmittable Container Object and the Re–Creation of Those Application–Usable Objects Therefrom" of Land Kind.

The Java Programming Language Specification, Aug. 1996, Section 15.11.2.

* cited by examiner

*Primary Examiner*—Gregory Morse
*Assistant Examiner*—Ted T. Vo (57) ABSTRACT

A method and apparatus for resolving method overloading at runtime that includes accessing an application programming interface file to retrieve methods that belong to the same class as a target method to select an exact method, which is a method where a data type of each of the parameters of the exact method is the same data type of a corresponding parameter of the target method, and if there is no exact method, to find a best method, which is a best method that most closely matches the target method.

20 Claims, 5 Drawing Sheets

APPARATUS AND METHOD FOR A RUNTIME METHOD OVERLOADING RESOLVER

FIELD OF THE INVENTION

This invention pertains to the field of computer interfaces, and more particularly to a method and an apparatus for resolving method overloading at runtime.

BACKGROUND OF THE INVENTION

This application is related to the copending U.S. Application of Lance Kind entitled "APPARATUS AND METHOD FOR IMPLEMENTING A NETWORK PROTOCOL THAT SUPPORTS THE TRANSMISSION OF A VARIABLE NUMBER OF APPLICATION-USABLE OBJECTS OVER A NETWORK AS A SINGLE NETWORK TRANSMITTABLE CONTAINER OBJECT AND THE RE-CREATION OF THOSE APPLICATION-USABLE OBJECTS THEREFROM", Serial No. 09/335,933 filed on the same date as the present application, and hereby incorporates by reference all that is disclosed therein.

This invention originates from a need for an improved way to integrate third party components into an application. This situation can arise where an application is built into a framework, which, in object-oriented programming, is a reusable basic design structure that assists in building applications. The advantage of utilizing a framework in applications is that third party components (also known as software components), which are modular software routines that can be combined with other components to form an overall program, can be integrated into an application without the need for an application developer to understand the inner workings of the third party components.

Some third party components are written in programming languages that support method overloading. Method overloading is a process of reusing the same method name for a method that accepts different parameter types. This allows a programmer to reuse the full functionality of a method on different parameter data types without having to create unique method names for each data type. For example, a third party component can be a component for sorting an array. To support the various data types that the array can accommodate, the third party component might use the same method name on a variety of data types. For example, the following is a third party component which defines three methods all named Sort which can sort an array Arg for types integer, string, and float:

EXAMPLE 1 array Sort(array int Arg)
array Sort(array string Arg)
array Sort(array float Arg)

Method Sort is said to be overloaded because it is defined differently three times. An application that incorporates this third party component might only incorporate a Sort method for strings. When the Sort functionality is requested from the application via a graphical user interface (hereinafter "GUI"), by clicking on an icon, for example, an event is generated. An event is some action taken by a user which initiates some action initiated by a computer. Here, for example, the event would map to a pre-defined function to initiate a process to invoke an appropriate Sort method for strings. This process involves binding a method signature (i.e., the method name and its parameters) to a method implementation defined in the third party component. If a method signature must be bound to one of many method implementations, method overloading resolution takes place. For example, if method Sort is invoked by Sort (NameList), where NameList is defined as an array of string, the invoked method Sort must be resolved to a method defined in the third party component. That is, given three methods named Sort, each of which comprise different parameter data types, a computer process must determine which method Sort in EXAMPLE 1 to invoke. Furthermore, if method Sort is invoked by Sort(Num), where Num is defined as a long, method overloading resolution must also resolve the invoked method to the closest defined method, which requires knowledge of inheritance and data type conversion. Once method overloading is resolved, a method signature can be bound to a method implementation.

Since method overloading resolution is currently performed at compile-time, an application developer must write a program in a third party component's native language to integrate component functionality so that methods can be resolved and bound. This task can be significantly onerous to an application's development cycle if, at every cycle, developers had to write or modify programs for every functionality requested by a user. Assume, for example, that a custom word processing application incorporates a third party component for sorting strings into its application. If a user of the application subsequently decides that a sort method for integers would also be useful, an application developer would have to write a program to incorporate a sort function for integers into the application. At a minimum, this would require modifying one or more programs of the third party component and recompiling those programs. This requires an application developer to know the language of the third party component in addition to the language of the application, and also requires an application developer to have access to an appropriate compiler for the component's language.

To alleviate or eliminate this footwork, a more dynamic approach to component integration is needed where programs do not need to be fully developed and then compiled to integrate new functionality. One solution is to bind methods at runtime rather than compile-time. Runtime method binding means that certain constructs of a third party component are pre-defined, which eliminates the need for an application developer to develop code in the component's language. As a result, integrating new functionality merely requires some programming in the application's language, rather than the component's language. Since the application developer already knows the language of the application, it is a trivial task at most to write code in the application's language to accommodate third party component functionality. For example, third party components which are developed with C++ virtual functions allow functions to be dynamically bound at runtime. If the application is written in language X, therefore, an application developer simply writes some code in language X to integrate a C++ virtual function. However, since type checking is performed at compile-time (with a C++ compiler), an application developer would still have to develop a program in the third party component's language if there are overloaded methods requiring type-checking. Moreover, it is necessary to have access to header files and libraries of any classes whose API's are used by the third party components, as well as a C++ compiler.

Java's Core Reflection API (referred to as the Reflection API) also allows methods to be bound at runtime. However, because Reflection API does not perform method overloading resolution, the parameter list of the invoking call must be exactly the same as the parameter list of the method which is to be invoked. While Reflection API could be used in conjunction with a compiler, such as Java, to perform compile-time method overloading resolution, the use of a compiler would still mean that a program must be developed in a third party component's language in order to integrate functionality from the component. Moreover, this would still require an application developer to know the specific language of the third party software component, and would also require the developer to have access to an appropriate compiler.

A need exists, therefore, for a method and an apparatus for integrating third party components that eliminates:

the need to know the specific language of a third party component; and the need to have access to an appropriate compiler.

SUMMARY OF THE INVENTION

This invention solves this need by providing a runtime method overloading resolver that both resolves methods and binds them at runtime rather than compile-time. This invention is, in general, directed to method and apparatus for a runtime method overloading resolver.

Thus, the invention comprises an apparatus for resolving method overloading at runtime, comprising number of computer readable media and computer readable program code stored on the computer readable media for resolving a target method that comprises at least one parameter, where the program code comprises program code for accessing an application programming interface file comprising a number of methods belonging to the same class as the target method; and program code for selecting one of the methods, where the program code for selecting comprises program code for selecting an exact method, where a data type of each of the parameters of the exact method is the same data type of a corresponding parameter of the target method, and program code for determining that there if there is no exact method, then a best method is to be selected, where the best method is a method that most closely matches the target method.

The invention may also comprise an apparatus for resolving method overloading at runtime, comprising a number of computer readable media and computer readable program code stored on the computer readable media for resolving a target method that comprises at least one parameter, where the program code comprises program code for accessing an application programming interface file comprising a number of methods belonging to the same class as the target method; and program code for selecting one of the methods, where the program code for selecting comprises program code for selecting an exact method, where a data type of each of the parameters of the exact method is the same data type of a corresponding parameter of the target method, and program code for determining that if there is no exact method, then a best method is to be selected, where the best method is a method that most closely matches the target method, and the program code for selecting a best method comprises program code for selecting a number of candidate methods from the number of methods, where a data type of each of the parameters of the target method can be assigned to a data type of a corresponding parameter of each of the candidate methods; program code for scoring each of the candidate methods; and program code for selecting one of the candidate methods having the best score.

The invention may also comprise a method for resolving method overloading at runtime, comprising accessing an application programming interface file comprising a number of methods belonging to the same class as a target method; and selecting one of the methods which comprises selecting an exact method, where a data type of each of the parameters of the exact method is the same data type of a corresponding parameter of the target method, and determining that if there is no exact method, then a best method is to be selected, where a best method is a method that most closely matches the target method.

The invention may also comprise an apparatus for resolving method overloading at runtime, comprising means for accessing an application programming interface file comprising a number of methods belonging to the same class as a target method; and means for selecting one of said number of methods.

BRIEF DESCRIPTION OF THE DRAWINGS

An illustrative and presently preferred embodiment of the invention is illustrated in the drawings in which.

DESCRIPTION OF PREFERRED EMBODIMENTS

Figure 1:
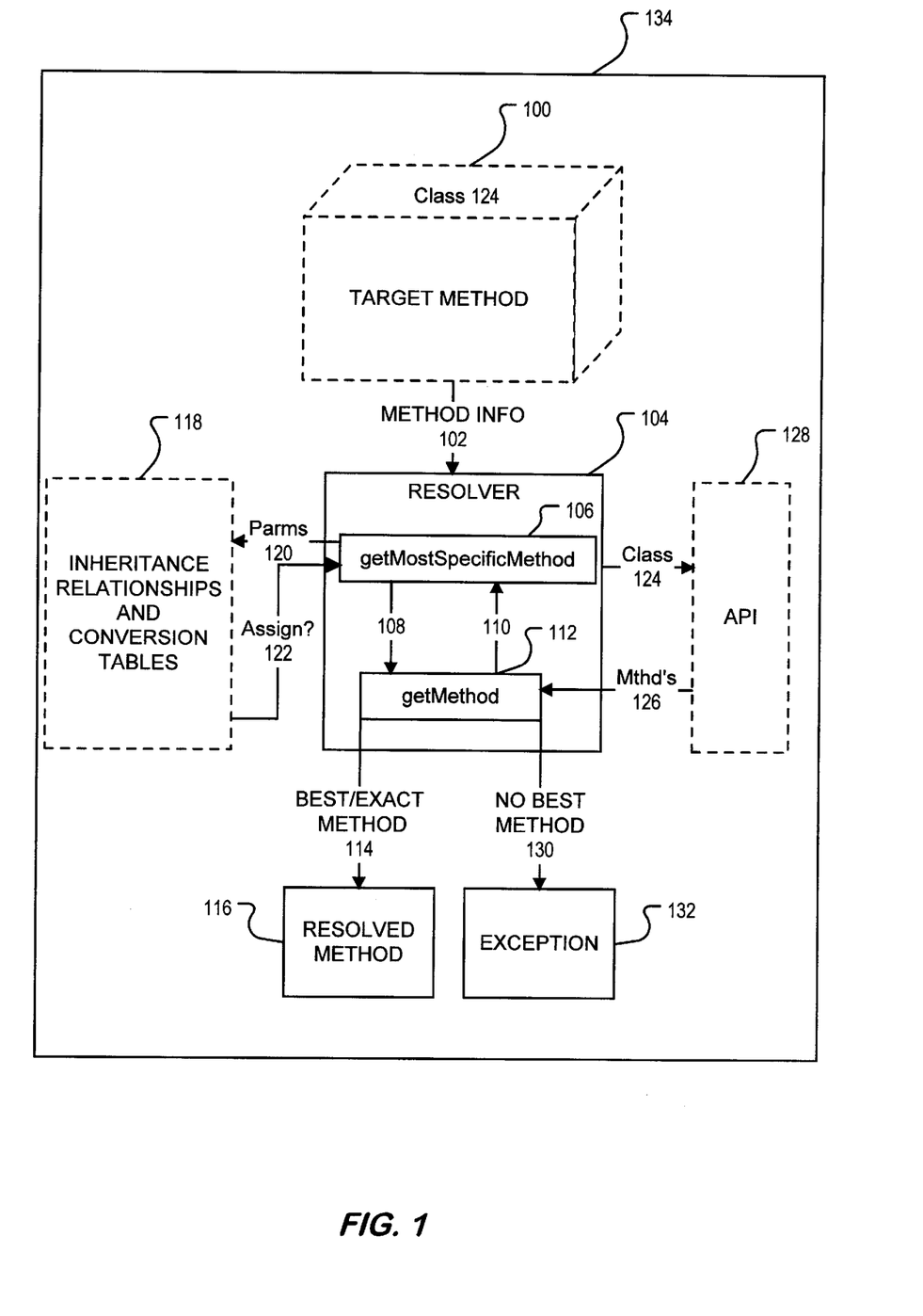
FIG. 1 illustrates an apparatus for a runtime method overloading resolver.

FIG. 1, in general, illustrates an apparatus for a runtime method overloading resolver. It comprises a Resolver 104 that resides on one or more computer readable media 134, which returns a resolved method 116. The Resolver receives method information 102 from a target method 100, and then passes 124 a class of the target method 100 to an application programming interface file 128 to retrieve 126 one or more methods implemented by the class. The one or more methods implemented by the class are passed to a method getMethod 112 which does some processing to determine if there is an exact method for the target method 100. If there is an exact method, it is returned 114 as the resolved method 116. If there is no exact method, method getMethod 112 invokes 110 a method getMostSpecificMethod 106 to find the best method for the target method 100. Method getMostSpecificMethod 106 finds the best method by accessing 120 inheritance relationships and conversion tables 118 to obtain a list of candidate methods and then determine if each target method parameter can be assigned 122 to a corresponding candidate method parameter. If so, it passes 108 the best method back to method getMethod 112. The best method is then returned 114 as the resolved method 116. If there is no best method, a MethodNotFound exception 132 is returned 130.

Figure 2:
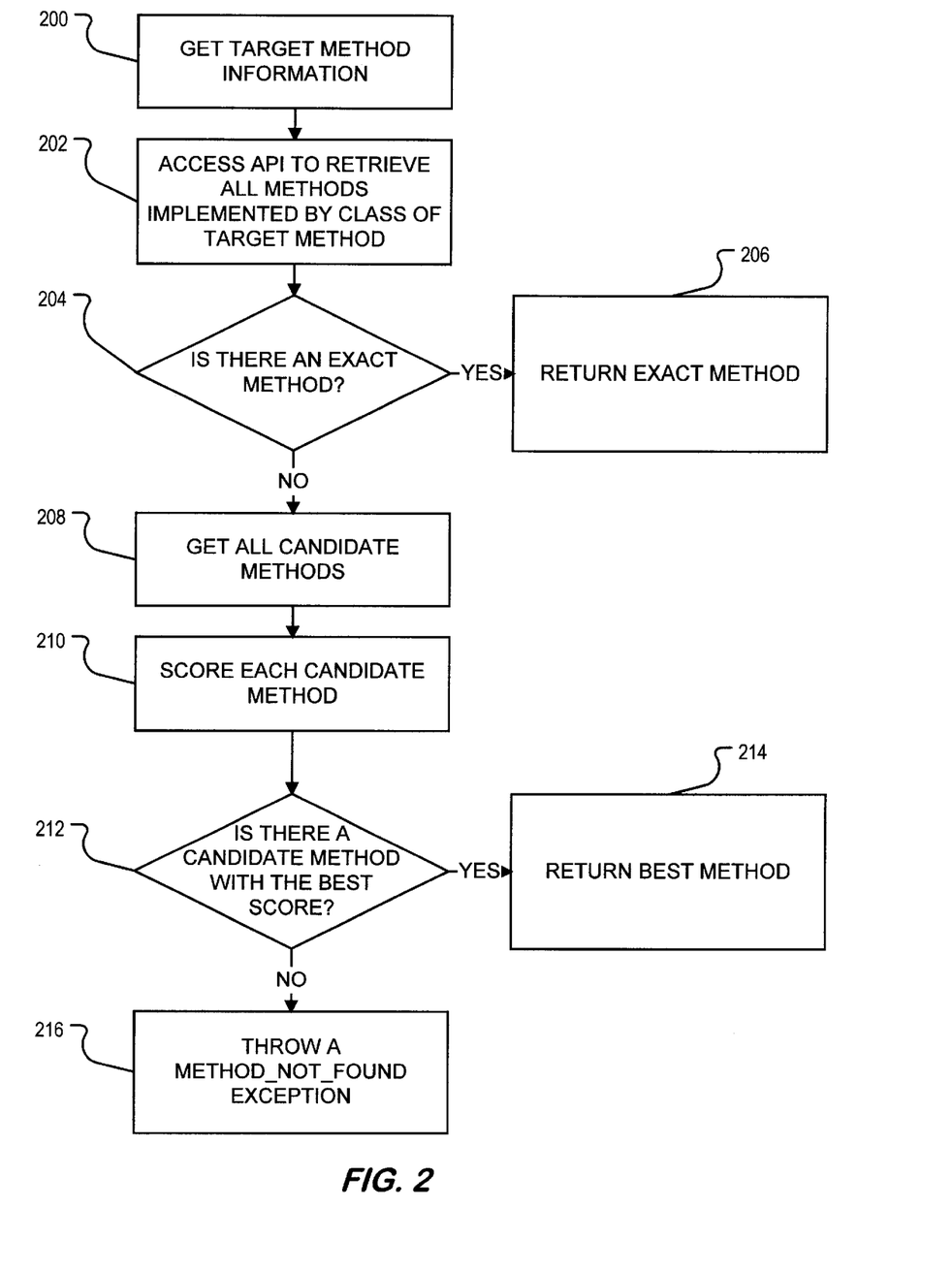
FIG. 2 illustrates a method for a runtime method overloading resolver.

FIG. 2, in general, illustrates a method for a runtime method overloading resolver. The method comprises getting target method information 200, and then accessing an application programming interface file to retrieve all the methods implemented by the class of the target method 202. If any of the implemented methods of the target class are an exact match 204, the exact method is returned 206. If there is no exact method, a set of candidate methods is obtained 208, where a candidate method is a method where a data type of each parameter of the target method can be assigned to a data type of a corresponding parameter of the candidate method. Each candidate method is scored 210 to determine a method which most closely matches the target method. If there is a candidate method with a best score 212, that candidate method is the best method and is returned 214. If there is no candidate method with the best score, it means that two or more candidate methods have the same score, and a MethodNotFound exception is thrown 216.

Introduction

In a preferred embodiment, a runtime method overloading resolver (hereinafter "the Resolver") is performed in a Hewlett-Packard Company (hereinafter HP) software package called Object-Action Manager®, or ObAM®. ObAM® is a user interface tool that enables rapid prototyping and development of applications through the integration of third party components. ObAM® offers its own tools for integrating third party component functionality so that knowledge of the third party component's underlying programming language and an appropriate compiler are not needed if the third party component offers features for binding its methods at runtime.

In a preferred embodiment, a third party component is a JavaBean® (also referred to as "bean") which is a reusable software component written in Sun Microsystem's Java programming language. JavaBeans® allow easy integration with other components because an application developer essentially only needs to introspect on a bean—i.e., know what properties are exposed by the bean, what methods the bean exports, and what events the bean can generate. To integrate JavaBeans® into an application, Java's Reflection API is used to obtain information about a class and its members. In Java, a class is a collection of members, including methods and variables, which usually serve to define the contents and capabilities of an object belonging to the class. For instance:

public class Circle {
  // Variables
    public double x, y;
    public double r;
  // Methods
    public double circumference( ) {return 2*3.14159*r};
    public double area( ) {return 3.14159*r*r};
  } defines a class having methods circumference and area, and variable x, y, and r, all of which define properties of an object of class Circle. Thus, an object, C, that is created as class Circle can use the methods and variables defined for the class:

Circle c=new circle( );
  double a;
  c.r=2.5;
  a=c.area( );

Reflection API is a concept that supports the JavaBeans® "introspection" mechanism described above, where properties, events, and methods that are supported by a bean can be determined by the classes that support the bean.

Figure 3:
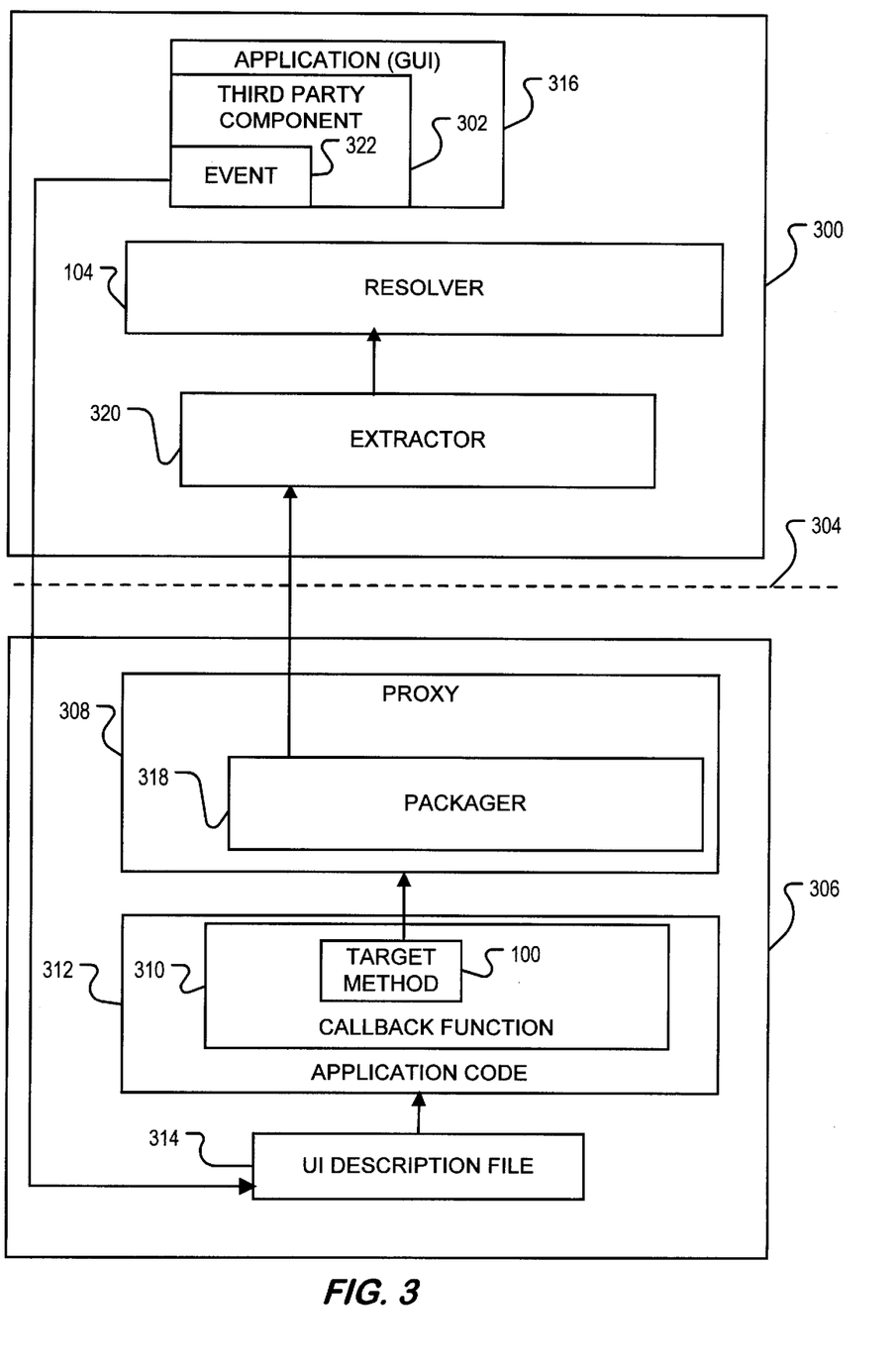
FIG. 3 illustrates an architecture of a runtime method overloading resolver in a preferred embodiment.

FIG. 3 illustrates an architecture surrounding the Resolver in a preferred embodiment. The architecture illustrates that ObAM® is implemented in a client/server environment, wherein an event 322 of a third party component 302 in an application 316 on a client machine 300 is generated, causing application code 312 residing on a server machine 306 to invoke a target method 100 associated with the event 322 in order to produce desired functionality in the application 316 (the application GUI as opposed to the application code). In one common scenario, an application developer seeks out functionality to incorporate into an application 316. For example, a developer wishes to add a sort functionality to his or her application 316 and finds a JavaBean® called Sort to support this function. To integrate functionality of a bean into the application using ObAM®, the application developer creates a UI (User Interface) Description File 314 to give a high level description of the user interface constructs of the third party component 302 in the application 316, such as what icons are available, and what event a particular icon generates. The application developer also creates a callback function 310 as part of application code 312 that provides a communication channel between the user interface aspects of the bean (such as icons), and the application 316, such as what method to invoke, and what the display elements of a particular method call are.

An event 322 is generated when a user clicks on an icon, or some other GUI element, on the client side 300. A UI Description File 314 on the server side 306, which comprises user interface constructs of the third party component, maps the event 322 to a callback function 310. In a preferred embodiment, the callback function 310 is written in application code to initiate method invocation. (It is also possible to initiate method invocation directly from the UI Description File.) It comprises information about a target method, which is a method comprising a method signature (having parameter values) that is to be bound to a resolved method, or a method implementation defined by a third party component. Target method information includes an object handle, method name, and method parameters. Since there can be more than one instance of a bean 302 running on a given client 300, the callback function comprises an object handle to help ObAM® determine which bean 302 instance to communicate with. If a third party component 302 defines many methods having the same name as a target method 100, method overloading resolution must also be performed. Since ObAM® makes this determination when the method is actually invoked by a user, ObAM® is said to perform method overloading resolution at runtime. This means that the application developer did have to write a program in Java to integrate Sort(NameList), and therefore, did not need access to a Java compiler.

The callback function invokes a function to convert any primitive data types into complex data types so that a method Proxy 308 (hereinafter "the Proxy") can serialize the parameters. Complex data types are primitive data types (booleans, bytes, characters, doubles, floats, integers, longs, and shorts) that are wrapped in a Java wrapper (i.e. java.lang.Boolean, java.lang.Byte, java.lang.Character, etc.), which is useful for manipulating primitive data types as objects. This is done by passing the primitive data type into a defined method of an appropriate class, which returns a class wrapper for the given data type. Since all objects are subclasses of java.lang.Object, or the Object root class in Java, parameters are placed into an array of Object (Object [ ], to be discussed).

The callback function 310 then invokes the Proxy 308, which comprises a Packager 318 to convert method information into network transmittable data and send network transmittable data over a network 304. Once the network transmittable method information is transmitted over the network, it is converted back to application-usable method information by an Extractor 320. The Resolver 104, which resides on the client 300 side with the application 316 can then use the application-usable method information to resolve the target method 100.

Operating in a Distributed Environment

The Proxy receives a number which represents an object handle, a string that represents the name of the target method, and an array of Objects. Since in a preferred embodiment, method overloading resolution at runtime occurs in an ObAM® distributed environment (i.e., the method invocation is remote), the job of the Proxy is to transmit all pieces of the target method across a network so that each piece can be analyzed and the target method can be bound to the correct method. This entails converting the object handle, method name, and method parameters into network transmittable data.

In general, data that is transmitted over a network must be marshalled, or converted into network transmittable data, usually in a series of bits. When the marshalled data is transmitted over a network, it is then demarshalled, or converted back into application-usable objects. In Java, data is marshalled via a serialization feature that converts application-usable data into a network transmittable array of bytes. In Java, an object is serialized by passing it to a writeObject( ) method of an ObjectOutputStream Class, which writes binary representations of an object to a stream. Likewise, an object can be re-created, or deserialized, by passing it to a readObject( ) method of an ObjectIntputStream Class, which reads binary representations of an object from a stream. An object in Java can only be serialized if it implements Java's Serializable interface, which acts as a marker that indicates whether serialization is allowed on a given data type. Basically, virtually all complex data types implement this interface.

The shortcoming of Java's serialization interface is that a single network transmittable object can only be deserialized into a single application-usable object once it is transmitted across the network. Since the object handle and method name are each single objects, Java's serialization feature can be used to individually transmit these target method objects across a network because each serialized object can be deserialized into its original application-usable object. However, if Java's serialization feature is used on method parameters, there would be no automated way of distinguishing one parameter from another parameter when the objects are deserialized.

Figure 4:
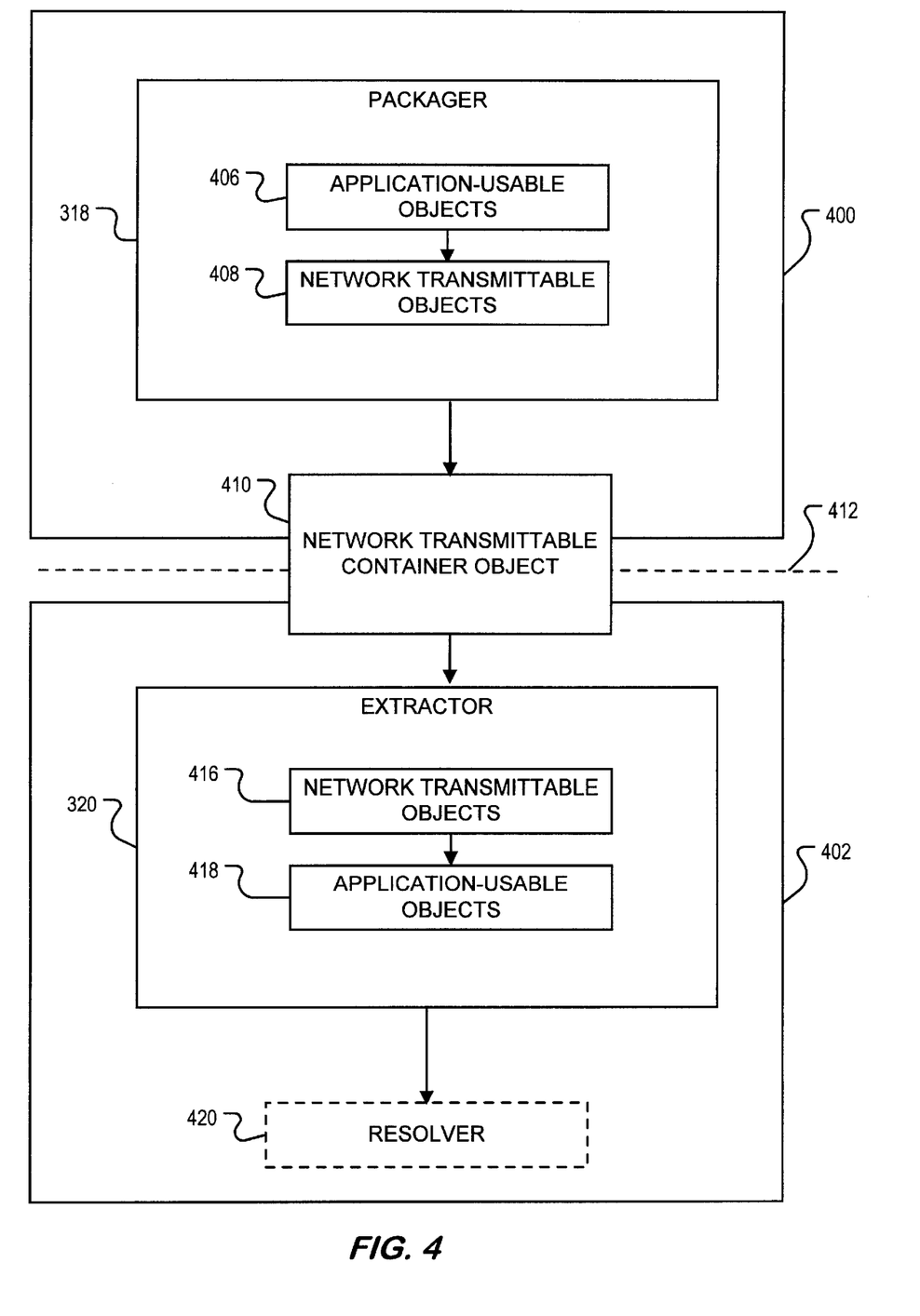
FIG. 4 illustrates an apparatus for a network protocol for using a runtime method overloading resolver in a distributed environment.

To address this problem, the Proxy implements a network protocol that uses Java's serialization feature with a network transmittable container object to support the transmission of multiple objects across a network and the extraction of those objects into application-usable objects. As shown in FIG. 4, implementing the protocol comprises using a Packager 318 on a first computer 400 for converting a variable number of application-usable objects 406 to a number of network transmittable objects 408, which are then used to create a single network transmittable container object 410 that can be transmitted over a network 412. The protocol also comprises using an Extractor 320 on a second computer 402 for extracting each network transmittable object 416 from the network transmittable container object 410 and converting each object 416 into an application-usable object 418. Each application-usable object 418 is then passed to the Resolver 420. In a preferred embodiment, a Packager 318 is used by the Proxy on a server, and an Extractor 320 is used by a method UISendData (to be discussed) on a client.

Figure 5:
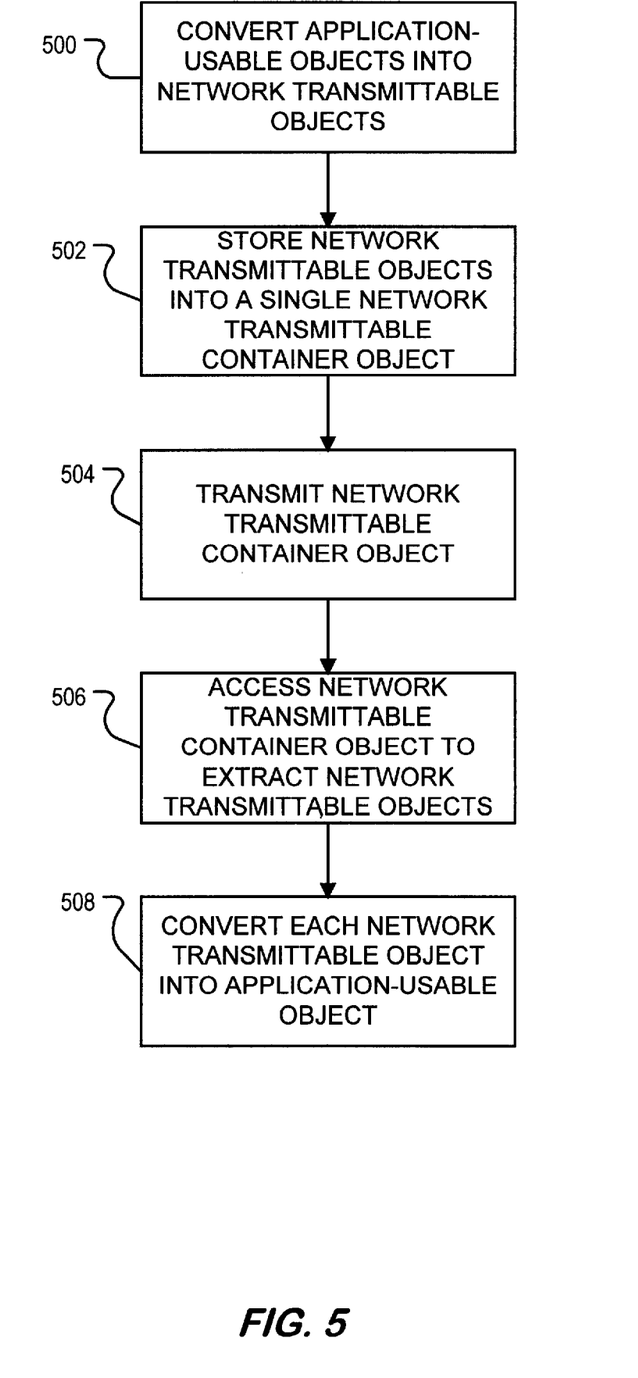
FIG. 5 illustrates a method for a network protocol for using a runtime method overloading resolver in a distributed environment.

The method for implementing the network protocol is shown in FIG. 5. Application-usable objects are converted into network transmittable objects 500, and then stored in a single network transmittable container object 502. The network transmittable container object is then transmitted over a network 504. Once it has been transmitted over the network, the network transmittable container object is accessed, where each object in the network transmittable container object is extracted 506. Each network transmittable object is then converted into an application-usable object 508.

In a preferred embodiment, a network transmittable container object is a two-dimensional array of bytes called an ObamData that stores serialized objects, where a first dimension represents a parameter object, and a second dimension represents a parameter object in its serialized form (i.e., in bytes). For example:

TABLE 1

| ObamData | | | | | |
|---|---|---|---|---|---|
| 10001010 | 10001010 | 10100011 | 10000110 | 00101101 | 010111110 |
| 01011010 | 00101000 | 10000011 | 10101000 | 10001001 | 101000100 |
| 01010010 | 11111110 | 11100100 | 11000101 | 10100011 | 001010001 |
| 01001001 | 11101001 | 01010001 | 00011111 | 11111111 | 111111000 |
| 01000000 | 01010000 | 11111010 | 10001111 | 10100001 | 101000000 |

TABLE 1 illustrates what an ObamData might look like for a method which has five parameters. In this ObamData, each row (one dimension) corresponds to a serialized parameter by referencing a number of columns (second dimension), and the columns referenced by a single row comprise bytes of the serialized parameter such that each of those columns comprises one byte. While a more realistic ObamData would comprise serialized parameters of different sizes, each serialized parameter of the ObamData in this example is a six byte column for simplicity of illustration. When ObamData data is transmitted over a network, it is transmitted in frames, where each frame can comprise any number of bytes of data stored in ObamData.

To package multiple parameters in an ObamData object, the Proxy passes in a number of application-usable objects (which in a preferred embodiment is stored in a one-dimensional array of Object, Object[ ], supra) as a parameter to method getObamData (Object object[ ]) (a method which accepts a one dimensional array named object comprising elements of type Object) of class ObamDataHelper. Method getObanData(Object object[ ]) calls a method getBytes of class ObamDataHel per to serialize each element in Object[ ] into a network transmittable object and to place the serialized object in ObamData[x][0], where the first dimension is represented by x for a parameter in relative position x (i.e., if x is 0, then position 0 occurs before position 1, etc.), and the second dimension is represented by 0 which refers to the beginning of the serialized object. The number of elements in the second dimension of a given element in the first dimension is dependent on the size of the serialized object. The following is an example of how getObamData is invoked:

// The following are parameters of a target method.

int Intval=3;

float Floatval=4.21;

string Stringname="TEXT";

// Create an array of 3 cells of type Object.

Object[ ] args=new Object[3];

// Store parameters in an array of Objects, (which gets passed to the Proxy), and convert primitive data types to complex data types. String is already complex.

args[0]=new Integer(Intval);
args[1]=new Float(Floatval);
// Convert the array of Objects to an ObamData.
byte[ ][ ] obamData=getObamData(args)

Thus, where the first element in array args starts at 0, args[0] represents a method parameter in relative position 0, args[1] represents a method parameter in relative position 1, and so forth. Each element of one-dimensional args is then placed in an element of two-dimensional ObamData: args[x] is inserted into ObamData[x][y], where x is an element number in the first dimension that represents a method parameter in relative position x, y is an element in the second dimension that represents a first byte, y+1 represents a second byte, and so forth. If any of the parameters is null, then null is stored in the byte array. This is done for all of the elements in the one-dimensional object array of type Object, such that parameters stored in ObamData are in the same order as the parameters appear in the target method. Once all objects in the one-dimensional array have been serialized into network transmittable data and stored in ObamData, ObamData can be transmitted across a network. Since each parameter is represented by one element of ObamData, an arbitrary number of method parameters can be packaged in a way that allows serialization to take place and stored in a single object (ObamData), and each parameter to be individually deserialized into an application-usable object. Without this protocol, there would be no way to distinguish one parameter from another, or to handle an arbitrary number of parameters or arbitrary types in an automated fashion.

The serialized method information (object handle, method name, and method parameters) is transmitted across a network to a method UISendData of class UIServerImpl. (When an object is serialized, some information about its class is serialized with it so that the correct class file can be loaded when the object is deserialized. This information about the class is represented by the java.io.ObjectStream-Class class.) Method UISendData deserializesthe object handle back to its original numeric object, and the method name back to its original String object. It then uses an Extractor which accesses ObamData to extract each network transmittable parameter and deserializes each network transmittable parameter back to its original application-usable object by invoking method getObjects (byte obamData[ ][ ]) of class ObamDataHelper. Method getObjects(byte obamData[ ][ ]) accesses a parameter, x, by accessing element [x][0] in ObamData, and placing it into a one-dimensional array of bytes. Method getObjects(byte obamData[ ][ ]) then invokes method getObjects(byte byte[ ]) which takes the one-dimensional array of bytes (which represents a single object, or parameter), deserializes the object (through a Java supported method discussed above), and returns the deserialized object of type Object back to method getObjects(byte obamData[ ][ ]). Method getObjects(byte obamData[ ][ ]) then places the object of type Object into Object[x]. Once this is done for each parameter in ObamData, a one-dimensional array of deserialized, application-usable objects of type Object results, where each element in the array represents a single application-usable parameter, and x is the parameter's position. Each application-usable parameter can then be accessed from this array. The actual parameter types are extracted from the one-dimensional array of deserialized objects and placed in an array of Class objects, which is a class that supports special objects that represent Java primitive types. The following is an example of how getObjects is invoked:

// Define a one-dimensional array of Objects. This is where deserialized objects are placed.
Object[ ] args2;
// Place deserialized parameters into args2.
args2=getObjects(ObamData);
// Each object can be extracted (into their complex data types, as shown by capitalized data types).
Integer Intval2=(Integer) args2[0];
Float Floatval2=(Float) args2[1];
String Stringname2=(String) args2[2];

Using the object handle received by the Proxy, method UISendData then finds a reference to the object instance that the method is to be invoked upon, and passes the object reference, method name, and method parameters (as individual objects) to a method for resolving the target method, hereinafter referred to as the Resolver 420.

This network protocol can also apply to network transmission features other than Java's network transmission feature via serialization. Although the network protocol described herein is used in conjunction with Java's serialization and deserialization of objects, it should be understood that this network protocol could equally apply to the marshalling and demarshalling of objects where multiple objects need to be transmitted over a network as a single object. For example, if a network transmission feature required that all objects be transmitted over a network as an array of bits, a two-dimensional array of bits could be created to transmit multiple parameters over the network as described herein.

Runtime Method Overloading Resolver

The Resolver comprises a number of methods for resolving method overloading at runtime. Method getMethod 112 of class UIServerImpl is invoked to reference the Reflection API file 128. If there are no parameters specified in the target method 100, method getMethod 112 simply looks up the target method in Reflection API 128 and returns 114 an exact method having the same name as the target method. If there are parameters, method getMethod 112 searches through the list of all methods of the target method's class 124 for a method having the same name and same number of parameters. For each method having the same name and same number of parameters, method getMethod 112 looks for a method comprising parameters that exactly match the parameters of the target method. If one is found, method getMethod 112 returns 114 this exact method to UISendData as the resolved method.

If none of the methods having the same name and number of parameters as the target method comprises the exact parameters as the target method, method getMethod 112 invokes 110 method getMostSpecific Method 106 of class UIServerImpl to further narrow the list of returned class methods by creating a list of candidate methods. A candidate method is a method comprising parameters such that a data type of each parameter of the target method can be assigned to a data type of a corresponding parameter of the same candidate method, where a corresponding parameter of a candidate method is a parameter in the same position as a parameter in the target method. Assignment can occur via inheritance of class attributes, or type conversion that is determined by a conversion matrix. Thus, a first data type can be assigned to a second data type if a class of the first data type can inherit from a class of the second data type, or if the first data type can be converted to the second data type. For example, assume the target method is X(int XA, int XB, int XC), and the class on which X is executed defines the following methods:

EXAMPLE 2

Y1(int A, float B, int C)
Y2(float D, float E, float F)

Y3(int G, int H, int I)
Y4(char J, char K, char L)

Conversion

Since integers can be converted to integers and floats, methods Y1, Y2, and Y3 are each candidate methods of method X because each of method X's parameters converts to a corresponding parameter of methods Y1, Y2, and Y3 (i.e., parameter XA converts to corresponding parameters A, D, and G; parameter XB converts to corresponding parameters B, E, and H; and parameter XC converts to corresponding parameters C, F, and I). On the other hand, since int's cannot be converted to char's, Y4 is not a candidate method for X. Type conversion is determined by a conversion table 118, or matrix, an example of which is produced in TABLE 2, below:

TABLE 2

|      | BYTE | CHAR | SHRT | INT | LONG | FLOAT | DOUB |
|------|------|------|------|-----|------|-------|------|
| BYTE | Y    | Y    | Y    | Y   | Y    | Y     | Y    |
| CHAR | N    | Y    | N    | Y   | Y    | Y     | Y    |
| SHRT | N    | N    | Y    | Y   | Y    | Y     | Y    |
| INT  | N    | N    | N    | Y   | Y    | Y     | Y    |
| LONG | N    | N    | N    | N   | Y    | Y     | Y    |
| FLOAT| N    | N    | N    | N   | N    | Y     | Y    |
| DOUB | N    | N    | N    | N   | N    | N     | Y    |

Inheritance

If a parameter is not a primitive data type with a corresponding Java class wrapper, conversion cannot be used. Instead, a target parameter, tparm(x) can be assigned to a candidate parameter, cparm(x) if the data type of tparm(x) belongs to a subclass of data type cparm(x) (and cparm(x)'s class is a superclass of tparm(x)), so that there is inheritance. For example, assume that Circle is a subclass of Shape, which would be defined as follows:

```
public class Shape {
    <Methods and variables of class Shape>
}
// Define Circle as a subclass of Shape.
public class Circle extends Shape {
    <Methods and variables of class Circle, which can also
        use methods and variables of class Shape.>
}
```

If a target method comprises parameter Obj1 of type Circle, and a candidate method comprises parameter Obj2 of type Shape, then inheritance allows Obj1 to be assigned to Obj2 because Obj1 has the same attributes of Obj2. In this example, there is one level, or ancestor, to get from tparm (Obj1) to cparm(Obj2). Inheritance relationships 118 (i.e., which classes are subclasses, and which ones are superclasses), can be built into the language or defined by a user.

To create a list of candidate methods, method getMostSpecificMethod 106 uses target method and class method parameters 120 with inheritance relationships and/or conversion tables 118 to determine which methods the target method can be assigned 122 to. In a preferred embodiment, each candidate method is stored in an array and then scored. When all methods have been scored, the resolved method 116 that is returned 114 is the method having the "best" score. One way to score a candidate method, C(x), is to compare a candidate method's parameters to parameters of each of the other candidate methods, where any given one of the other candidate methods is represented by C(o). If a data type of each parameter of C(x) can be assigned to a data type of a corresponding parameter of C(o), then C(o) receives a point. Scoring is done for each candidate method, and comparing is done against all of the other candidate methods. The "best" score, in this case, is the lowest score, such that the resolved method is the method having the least number of points. Thus, in EXAMPLE 2 above, each candidate method Y1, Y2, and Y3 is scored as follows:

1. Compare Y1(int A, float B, int C) to:
    Y2(float D, float E, float F): Y1's parameters can be assigned to Y2's parameters because an integer can be converted to a float. Y2 is assigned a point.
    Y1=0;
    Y2=1;
    Y3=0;
    Y3(int G, int H, int I): Y1's parameters cannot be assigned to Y3's parameters because a float cannot be converted to an integer.
    Y1=0;
    Y2=1;
    Y3=0;
2. Compare Y2(float D, float E, float F) to:
    Y1(int A, float B, int C): Y2's parameters cannot be assigned to Y1's parameters because a float cannot be converted to an integer:
    Y1=0;
    Y2=1;
    Y3=0;
    Y3(int G, int H, int I): Y2's parameters cannot be assigned to Y3's parameters because a float cannot be converted to an integer.
    Y1=0;
    Y2=1;
    Y3=0;
3. Compare Y3(int G, int H, int I) to:
    Y1(int A, float B, int C): Y3's parameters can be assigned to Y1's parameters because an integer can be converted to a float. Y1 is assigned a point.
    Y1=1;
    Y2=1;
    Y3=0;
    Y2(float D, float E, float F): Y3's parameters can be assigned to Y2's parameters because an integer can be converted to a float. Y2 is assigned a point.
    Y1=1;
    Y2=2;
    Y3=0;

Without this algorithm, one could easily determine that candidate method Y3(int G, int H, int I) is the best match for target method X (int XA, int XB, int XC) because each parameter of method Y3 is an exact match for each parameter of method X. Indeed, this is the conclusion that the algorithm reaches, since method Y3 has the "best" score, which in this case is the lowest score. When scoring a candidate method, C(x), C(x) can also or alternatively be assigned to another candidate method, C(o), if the classes of the parameters of C(x) can inherit the classes of the parameters of C(o), as discussed above. This is the scoring algorithm is suggested in *The Java Programming Language Specification*, August, 1996, §15.11.2. Methods can also be scored such that C(x) (the method being scored) receives a point if its parameters can be assigned to parameters of another candidate method C(o). The "best" score in this case, then, would be the highest score, such that the resolved method is the method which has the greatest number of points.

Another way to score a candidate method, C(x), is to compare C(x)'s parameters to a corresponding parameter of the target method, T(x). Using this approach, a comparison of parameters is made to determine how close of a match a target parameter, tparm(x), is to a corresponding candidate method, cparm(x), where x is the position of the parameter. This proximity factor is determined by a conversion/widening matrix, illustrated in TABLE 3:

TABLE 3

| Index | Complex Data Type |
|---|---|
| 0 | java.lang.Byte |
| 1 | java.lang.Char (can only be converted to data types with an index >=2) |
| 1 | java.lang.Short |
| 2 | java.lang.Integer |
| 3 | java.lang.Long |
| 4 | java.lang.Float |
| 5 | java.lang.Double |

The proximity factor for cparm(x) with respect to tparm(x) is calculated as INDEX(cparm(x))−INDEX(tparm(x)), where INDEX corresponds to a given data type's conversion hierarchy level that is obtained from the conversion/widening matrix of TABLE 3. Thus, if tparm(1) is an int, and cparm(1) is a float, then the score for cparm(1) is 2 (4−2). The greater the proximity factor for a particular parameter, the less of a match there is between tparm(x) and cparm(x). This means that as a proximity factor for a parameter increases, the score for its corresponding candidate method increases, such that the greater a score for a candidate method, the less of a match the candidate method is for the target method.

In reference to EXAMPLE 2, where the target method is defined as method X(int XA, int XB, int XC), and methods Y1, Y2, and Y3 are candidate methods, the best match for method X is determined as follows:

1. Compare target method X(int XA, int XB, int XC) to candidate method Y1(int A, float B, int C):
   Proximity Factors:
      INDEX(int A)−INDEX(int XA)=2−2=0
      INDEX(float B)−INDEX(int XB)=4−2=2
      INDEX(int C)−INDEX(int XC)=2−2=0
   Score for method Y1=2.

2. Compare target method X(int XA, int XB, int XC) to candidate method Y2(float D, float E, float F):
   Proximity Factors:
      INDEX(float D)−INDEX(int XA)=4−2=2
      INDEX(float E)−INDEX(Int XB)=4−2=2
      INDEX(Float F)−INDEX(Int XC)=4−2=2
   Score for method Y2=6.

3. Compare target method X(int XA, int XB, int XC) to candidate method Y3(int G, int H, int I):
   Proximity Factors:
      INDEX(Int G)−INDEX(Int XA)=2−2=0
      INDEX(Int H)−INDEX(Int XB)=2−2=0
      INDEX(Int I)−INDEX(Int XC)=2−2=0
   Score for method Y3=0.

As one could easily determine by looking at methods Y1, Y2, and Y3, Y3(int G, t H, int I) is the best match for method X(int XA, int XB, int XC). Y1(int A, float B, int C) is the second best match, and Y2(float D, float E, float F) is the third best (or worst) match. The algorithm presented above also reaches this conclusion, where the method having the lowest score, method Y3 with a score of 0, is the best match, and the method having the greatest score, method Y2 with a score of 6, is the worst match.

TABLE 4 is sample Java pseudocode for this algorithm. This pseudocode distinguishes between parameters belonging to different Java Classes. Essentially, if tparm(x) does not belong to a Class that is a Java class wrapper (i.e., java.lang.Boolean), the proximity factor for the parameter being scored, cparm(x), is equal to the number of ancestors from tparm(x) to cparm(x), as determined by rules of inheritance, discussed above.

TABLE 4

```
/* CandidateSet contains a set of method signatures and references
to the actual method instance. */
/* Target is a type that stores a method signature. */
/* Candidate is a type that contains a reference to a method
instance. */
/* Return the candidate method out of cSet that is the best
overloading match for t. If t cannot be resolved to a clear winner,
then throw a MethodNotFound exception. */
Candidate getMostSpecificMethod(CandidateSet cSet, Target t)
{
    Candidate   bestCandidate =   null;
    Candidate   candidate =       null;
    int         bestScore =       infinity;
    int         score;
    boolean     tie =             false:
    <For each candidate that exists in cSet>
    {
        score =                score (candidate, t);
        if (score < bestScore)
        {
            tie =              false;
            bestScore =        score;
            bestCandidate =    candidate;
        } else if (score == bestScore){
            tie =              true;
        }
    }
    if (tie)
    {
        throw MethodNotFound
    }
    return bestCandidate;
}
/* Returns an integer which represents a proximity factor, how well
well c matches t. The larger the number, the worse the match. */
int score(Candidate c, Target t)
{
    int       score =       0;
    int       position =    -1;
    <for each parameter type e that exists in T>
    {
        position++;
        if <e is a Java Class that is not a Primitive wrapper>
        {
            score =           score + number of
    ancestors from e tp param(c. position).
        } else {
            score =           score + primConvScore(e,
    param(c, position));
        }
    }
    returns score:
}
/* Returns a weighted score based on how much widening is needed in
primitive type conversion. */
int primConvScore(Class e. Class c)
{
    int       targetType, CandidateType;
    if <e is a java.lang.Boolean>
    {
        return 0;
        /* Booleans can only assign into Booleans so a score of
        0 is returned since c must be a possible candidate (a
        Boolean). */
    }
    if <e is not a java.lang.Character>
```

TABLE 4-continued

```
{
    targetType =      get INDEX for e;
    candidateType =   get INDEX for c;
    return            candidateType - targetType;
} else {
    if <c is a java.lang.Character>
    {
        return 0;         //Character assigning into Character.
    } else {
        return (get INDEX for c) – 1;
    }
}
}
```

If there are candidate methods with tied "best" scores, then there is no single candidate method with the "best" score. This means that the target method is ambiguous in which case a MethodNotFound exception 132 is thrown 130. If a best method, or resolved method, is found, method getMostSpecificMethod returns 108 a reference to the resolved method 116 back to method getMethod 112, which returns 114 the resolved method 116 to method UISendData. Method UISendData then invokes the resolved method using the target method's parameters. In reference to EXAMPLE 1, supra, UISendData would resolve the target method Sort(NameList), where NameList is an array of string, to the resolved method Sort(array string Parm) by invoking the resolved method with the invoked method's parameters, Sort (array string NameList).

In some instances, invoking the resolved method generates return values. For instance, invoking method Sort(array string NameList) would cause method Sort (array string NameList) of the third party component to sort array NameList of string, which would generate a sorted array of strings. A return value in this case, for example, would be the sorted array of strings. If there are return values, method UISendData converts the values to a string and then serializes the string. The serialized value is transmitted over a network back to the Proxy on the server side. The Proxy deserializes the return value, and returns the value back to its caller, which is the target method's callback function. Since a callback function provides a communication channel between the third party component and the application, supra, the callback function inherently knows how to handle the return value that is specific to the application. As an example, since the callback function knows how the application and third party component interface, it might be coded to format the sorted array of strings such that the sorted strings are properly displayed in the instance of the third party component running in the application.

While runtime method overloading resolution has been described in a language-specific context herein, it should be emphasized that these concepts can also have generic applicability. The dynamics of programming languages is such that concepts which are developed by a programming language often become widely accepted and, unless legally protected under the law, are subsequently adopted by other languages. Object-oriented programming is an example of a programming language concept that has been adopted by various programming languages, including C and Java. Within the context of this patent application, Java concepts such as classes and API's should be construed as general concepts that may be adopted by other programming languages, if they are not used already. As such, while the runtime method overloading resolver interfaces with concepts which may be language-specific, it should be construed to have equal applicability in other languages as well.

Furthermore, runtime method overloading resolution should also be understood as being operable in a non-client/server environment. Although runtime method overloading resolution has been described herein as operating in a client/server environment, it is a preferred embodiment only. Runtime method overloading resolution is to be equally operable in environments such as host-centric systems, where an Application, Third Party Component, Event, UI Description File, Application Code, Callback Function, Target Method, and Resolver all reside on a single machine rather than multiple machines.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for resolving method overloading at runtime, comprising:
   a. a number of computer readable media; and
   b. computer readable program code stored on said number of computer readable media, said computer readable program code for resolving a target method, wherein said target method comprises at least one parameter, said program code comprising:
      i. program code for accessing an application programming interface file comprising a number of methods overloaded with said target method; and
      ii. program code for selecting one of said number of methods, said code for selecting comprising:
         (1) program code for selecting an exact method, wherein a data type of each of said at least one parameter of said exact method is the same data type of a corresponding said at least one parameter of said target method;
         (2) program code for determining that if there is no exact method, then a best method is to be selected; and
         (3) program code for selecting said best method, said code for selecting said best method comprising:
            a. program code for selecting a number of candidate methods from said number of methods, and wherein a data type of each of said at least one parameter of said target method can be assigned to a data type of a corresponding said at least one parameter of each of said number of candidate methods;
            b. program code for scoring each of said number of candidate methods wherein said program code for scoring each of said number of candidate methods comprises program code for determining if a first candidate method can be assigned to a second candidate method, said code for determining comprising:
               I. program code for determining if a data type of a given one of said at least one parameter of said first candidate method can be assigned to a data type of a corresponding said at least one parameter of said second candidate method parameter; and
               II. program code for assigning a point if a data type of each of said at least one parameter of said first candidate method can be assigned to a data type of a corresponding said at least one parameter of said second candidate method; and c. said code for selecting said best method further comprising program code for selecting one of said number of candidate methods having the best score, wherein said one of said number of candidate methods having the best score comprises said best method.

2. An apparatus as in claim 1, wherein said program code for determining if a data type of given one of said at least one parameter of said first candidate method can be assigned to a data type of a corresponding said at least one parameter of said second candidate method parameter comprises program code for accessing a conversion matrix to determine if said data type of said given one of said at least one parameter of said first candidate method can be converted to a data type of said corresponding said at least one parameter of said second candidate method parameter.

3. An apparatus as in claim 1, wherein said program code for determining if a data type of a given one of said at least one parameter of said first candidate method can be assigned to a data type of a corresponding said at least one parameter of said second candidate method parameter comprises program code for determining if a class of said given one of said at least one parameter of said first candidate method can inherit from a class of said corresponding said at least one parameter of said second candidate method parameter.

4. An apparatus as in claim 1, wherein said program code for assigning a point comprises program code for assigning a point to said second candidate method, and wherein said best score is one of said number of candidate methods having the least number of points.

5. An apparatus as in claim 1, wherein said program code for scoring each of said number of candidate methods comprises program code for calculating the sum of at least one proximity factor, wherein each of said at least one proximity factor corresponds to a given said at least one parameter of a given one of said number of candidate methods to determine how close of a match said at least one parameter of said given candidate method is to a corresponding said at least one parameter of said target method.

6. An apparatus as in claim 5, wherein program code for determining a given one of said at least one proximity factor comprises:
   a. program code for accessing a conversion/widening matrix to determine a first index for a given one of said at least one parameter of said given candidate method, and a second index for a corresponding said at least one parameter of said target method, wherein said index corresponds to a given data type's conversion hierarchy level; and
   b. program code for calculating the difference between said first index and said second index.

7. An apparatus as in claim 6, wherein said best score is one of said number of candidate methods having the least number of points.

8. An apparatus as in claim 5, wherein program code for determining a proximity factor for a given one of said at least one parameter of said given candidate method comprises program code for determining the number of ancestors from a class of a corresponding one of said at least one parameter of said target method to a class of said given one of said at least one parameter of said given candidate method.

9. An apparatus as in claim 1, additionally comprising program code for implementing a network protocol for using said runtime method overloading resolver in a distributed environment, said program code comprising:
   a. program code for serializing said variable number of application-usable objects into a variable number of serialized objects, wherein each of said variable number of application-usable objects corresponds to a different one of said variable number of serialized objects, and each of said variable number of serialized objects comprises at least one byte;
   b. program code for creating a two-dimensional array of bytes, said program code comprising:
      i. program code for creating a first dimension array comprising a number of elements, wherein each of said number of elements of said first dimension array represents a given one of said variable number of serialized objects by referencing a second dimension array comprising a number of elements; and
      ii. program code for creating said second dimension array, wherein said number of elements of said second dimension array referenced by said given element of said first dimension array comprise said at least one byte of said given one of said variable number of serialized objects, whereby each of said number of elements of said second dimension array comprises one of at least one byte of said given one of said variable number of serialized objects; and
   c. program code for storing said given one of said variable number of serialized objects in said two-dimensional array of bytes.

10. An apparatus as in claim 9, additionally comprising:
    a. program code for transmitting said two-dimensional array of bytes over a network;
    b. program code for re-creating a variable number of application-usable objects from said two-dimensional array of bytes, comprising:
       i. program code for accessing said two-dimensional array of bytes to extract each of said variable number of serialized objects; and
       ii. program code for deserializing each of said variable number of serialized objects into said variable number of application-usable objects.

11. An apparatus as in claim 9, wherein said program code for creating a first dimension array comprising a number of elements comprises program code for creating a first dimension array comprising a number of elements wherein a number associated with a given one of said number of elements of said first dimension array corresponds to a relative position of a variable number of application-usable objects, wherein said application-usable objects are positioned in a particular order.

12. A method for resolving method overloading at runtime, comprising:
    a. accessing an application programming interface file comprising a number of methods overloaded with a target method; and
    b. selecting one of said number of methods, comprising:
       i. selecting an exact method, wherein a data type of each of said at least one parameter of said exact method is the same data type of a corresponding said at least one parameter of said target method; and
       ii. if there is no exact method, selecting a best method by:
          (1) selecting a number of candidate methods from said number of methods, and wherein a data type of each of said at least one parameter of said target method can be assigned to a data type of a corresponding said at least one parameter of each of said number of candidate methods;
          (2) scoring each of said number of candidate methods wherein said scoring each of said number of candidate methods comprises determining if a first candidate method can be assigned to a second candidate method, said determining comprising:

I. determining if a data type of a given one of said at least one parameter of said first candidate method can be assigned to a data type of a corresponding said at least one parameter of said second candidate method parameter; and II. assigning a point if a data type of each of said at least one parameter of said first candidate method can be assigned to a data type of a corresponding said at least one parameter of said second candidate method; and (3) said selecting a best method further comprising selecting one of said number of candidate methods having the best score as said best method.

13. A method as in claim 12, wherein said determining if a data type of given one of said at least one parameter of said first candidate method can be assigned to a data type of a corresponding said at least one parameter of said second candidate method parameter comprises accessing a conversion matrix to determine if said data type of said given one of said at least one parameter of said first candidate method can be converted to a data type of said corresponding said at least one parameter of said second candidate method parameter.

14. A method as in claim 12, wherein said determining if a data type of a given one of said at least one parameter of said first candidate method can be assigned to a data type of a corresponding said at least one parameter of said second candidate method parameter comprises determining if a class of said given one of said at least one parameter of said first candidate method can inherit from a class of said corresponding said at least one parameter of said second candidate method parameter.

15. A method as in claim 12, wherein said scoring each of said number of candidate methods comprises calculating the sum of at least one proximity factor, wherein each of said at least one proximity factor corresponds to a given said at least one parameter of a given one of said number of candidate methods to determine how close of a match said at least one parameter of said given candidate method is to a corresponding said at least one parameter of said target method.

16. A method as in claim 15, wherein determining a given one of said at least one proximity factor comprises:

a. accessing a conversion/widening matrix to determine a first index for a given one of said at least one parameter of said given candidate method, and a second index for a corresponding said at least one parameter of said target method, wherein said index corresponds to a given data type's conversion hierarchy level; and b. calculating the difference between said first index and said second index.

17. A method as in claim 15, wherein determining a proximity factor for a given one of said at least one parameter of said given candidate method comprises determining the number of ancestors from a class of a corresponding one of said at least one parameter of said target method to a class of said given one of said at least one parameter of said given candidate method.

18. A method as in claim 12, additionally comprising implementing a network protocol for using said runtime method overloading resolver in a distributed environment, comprising:

a. creating a two-dimensional array of bytes, comprising:

i. serializing said variable number of application-usable objects into a variable number of serialized objects, wherein each of said variable number of application-usable objects corresponds to a different one of said variable number of serialized objects, and each of said variable number of serialized objects comprises at least one byte;

ii. creating a first dimension array comprising a number of elements, wherein each of said number of elements of said first dimension array represents a given one of said variable number of serialized objects by referencing a second dimension array comprising a number of elements; and iii. creating said second dimension array, wherein said number of elements of said second dimension array referenced by said given element of said first dimension array comprise said at least one byte of said given one of said variable number of serialized objects, whereby each of said number of elements of said second dimension array comprises one of at least one byte of said given one of said variable number of serialized objects; and b. storing said given one of said variable number of serialized objects in said two-dimensional array of bytes.

19. A method as in claim 18, additionally comprising:

a. transmitting said two-dimensional array of bytes over a network;

b. re-creating a variable number of application-usable objects from said two-dimensional array of bytes, comprising:

i. accessing said two-dimensional array of bytes to extract each of said variable number of serialized objects; and ii. deserializing each of said variable number of serialized objects into said variable number of application-usable objects.

20. A method as in claim 18, wherein said creating a first dimension array comprises creating a first dimension array comprising a number of elements wherein a number associated with a given one of said number of elements of said first dimension array corresponds to a relative position of a variable number of application-usable objects, wherein said application-usable objects are positioned in a particular order.

* * * * *